(12) United States Patent
Öhman

(10) Patent No.: US 6,383,342 B1
(45) Date of Patent: May 7, 2002

(54) CLUSTER RULE COMPLIANCE WITH REDUCED STEAM CONSUMPTION

(75) Inventor: Jan Öhman, Helsinki (FI)

(73) Assignee: Andritz-Ahlstrom Oy, Espoo (FI)

( * ) Notice: Subject to any disclaimer, the term of this patent is extended or adjusted under 35 U.S.C. 154(b) by 0 days.

(21) Appl. No.: 09/523,963

(22) Filed: Mar. 13, 2000

Related U.S. Application Data

(60) Provisional application No. 60/124,848, filed on Mar. 17, 1999.

(51) Int. Cl.[7] ............................. B01D 3/38; D21C 1/02; D21C 11/06
(52) U.S. Cl. ............................. 203/49; 203/25; 203/27; 203/100; 203/98; 203/DIG. 8; 203/DIG. 14; 162/46; 162/47; 162/68
(58) Field of Search ....................... 203/25, 27, DIG. 8, 203/98, 100, DIG. 14, 49; 159/24.1, 16.3, 47.3; 162/68, 46, 47, 1, 29

(56) References Cited

U.S. PATENT DOCUMENTS 3,807,479 A * 4/1974 Brannland et al. ......... 189/47.3
5,830,314 A * 11/1998 Mattsson .................... 159/17.1
6,217,711 B1 * 4/2001 Ryham et al. ................. 162/46

* cited by examiner

*Primary Examiner*—Virginia Manoharan
(74) *Attorney, Agent, or Firm*—Nixon & Vanderhye P.C.

(57) ABSTRACT

A method and system for handling foul condensate containing Hazardous Air Pollutants (HAPs) in a cellulose pulp mill has enhanced energy efficiency and lower cooling water usage, while complying with the Cluster Rules and other environmental regulations. The condensate is fed countercurrently to stripping vapor in the stripping column to produce a HAPs vapor and a clean condensate. Part of the clean condensate is fed from the stripping column reboiler, and the HAPs-rich vapor is directed to the reboiler to at least partially condense while vaporizing the clean condensate into the clean vapor (stripping vapor). The pressure of the stripping vapor is increased, such as utilizing a steam ejector, to about 0.1–30 psig and then is used as the stripping vapor in the stripping column. The non-condensed HAPs-rich vapor is fed to an external condenser, and the dirty condensate from the external condenser and the dirty condensate from the reboiler, are returned to the stripping column.

14 Claims, 2 Drawing Sheets

CLUSTER RULE COMPLIANCE WITH REDUCED STEAM CONSUMPTION

CROSS REFERENCE TO RELATED APPLICATION

This application is based upon provisional application Serial No. 60/124,848 filed Mar. 17, 1999, the disclosure of which is hereby incorporated by reference herein.

BACKGROUND AND SUMMARY OF THE INVENTION

It has been very important in order to comply with environmental regulations in the United States to deal with the "Cluster Rules" established by the Environmental Protection Agency.

The Cluster Rules basically say that a cellulose pulp mill (e.g. kraft mill) has to collect streams of condensate resulting from the pulping operation containing at least 65% of the HAP's (by EPA defined as MeOH which is a surrogate for real HAP's which might be more than 50 different kinds of components) and to treat these condensates so that 92% of this HAP (MeOH) is removed and typically destroyed by conventional thermal oxidation, or the methanol is recovered therefrom in a conventional methanol recovery plant..

The mill will also elect to show that 7.2 lb/ODTP for unbleached pulp or 11.1 lb/ODTP for bleached pulp has been collected into a stream(s) which can be treated to remove 6.6 lb/ODTP and 10.2 lb/ODTP, respectively, with a maximum HAP (MeOH) concentration of 210 ppmv and 330 ppmv, respectively.

One good way to achieve Cluster Rules compliance is shown in copending application Ser. No. 09/248,006, filed Feb. 10, 1999, now U.S. Pat. No. 6,217,711. The invention provides an alternative and simple way to facilitate Cluster Rules compliance by enhancing the steam stripping operation.

According to the present invention, a method and system are provided for handling fluid streams, desirably foul condensate and treatment and product fluids associated therewith, that are advantageous over the art. The method and system of the invention achieve a significant energy saving, including reducing the amount of steam consumption, and achieve a significant cooling water saving, compared to conventional methods and systems.

According to one aspect of the invention, there is provided a method of handling fluid streams in a cellulose pulp mill using a stripping column and reboiler, comprising: a) Collecting foul condensate containing Hazardous Air Pollutants (HAPs) in a cellulose pulp mill. b) Feeding the foul condensate to the stripping column. c) In the stripping column, causing the foul condensate to flow countercurrently to stripping vapor so as to produce a HAPs-rich vapor and a clean condensate. d) Feeding at least part of the clean condensate from c) from the stripping column to the reboiler. e) Directing the HAPs-rich vapor from c) to enter the reboiler and at least partially condense while vaporizing clean condensate fed into the reboiler in d) to form a stripping vapor. f) Increasing the pressure of the stripping vapor from e). And g) using the increased pressure stripping vapor from f) as the stripping vapor in c). Usually c) is practiced to cause the stripping vapor to move upwardly while the foul condensate moves downwardly in the stripping column.

Preferably, f) is practiced to increase the pressure of the stripping vapor to about 0.1–30 psig (or any other narrower range within that broad range such as about 1–15 psig), most preferably about 5–10 psig. In a preferred embodiment, f) is practiced using a steam ejector. For example the steam ejector is supplied with clean steam at a pressure of between about 60–165 psig. The invention also preferably further comprises using the clean steam supplied to the steam ejector with the increased pressure stripping vapor from e) as the stripping vapor in g). Normally, the stripping vapor in c) is at a pressure about 0.1–30 psig.

The method may also further comprise h) feeding the condensed HAPs-rich vapor from e) to the stripping column. Preferably, h) is practiced by feeding the condensed HAPs-rich vapor to the stripping column above the area where the foul condensate in b) is introduced. In the method desirably part of the HAPs-rich vapor does not condense in the reboiler, and is fed from the reboiler to an external condenser to condense into condensate; and the condensate from the external condenser is combined with the condensed vapor from h) and fed to the stripping column.

Desirably clean condensate is formed in the reboiler; and the method further comprises using the clean condensate from the reboiler elsewhere in the pulp mill, such as in bleaching or washing of diluting of cellulose pulp, or slurrying comminuted cellulosic fibrous material prior to making pulp.

According to the invention, a)–g) are practiced so as to use less than 50% (e.g. about 20–25%) of the steam necessary to strip the same amount of foul condensate than if d)–g) were not practiced. Also, a)–g) are practiced so as to use less than about ⅓ (e.g. about 25–30%) of the cooling water to effect condensation in the external condenser than if d)–g) were not practiced.

According to another aspect of the present invention there is provided a method of handling fluid streams in a cellulose pulp mill comprising: a) Collecting foul condensate containing Hazardous Air Pollutants (HAPs) in a cellulose pulp mill. b) Causing the foul condensate to flow countercurrently to stripping vapor so as to produce a HAPs-rich vapor and a clean condensate. c) Vaporizing at least part of the clean condensate from b) using the HAPs-rich vapor from b) so that HAPs-rich vapor at least partially condenses and vaporizes clean condensate from b) to form a stripping vapor. d) Increasing the pressure of the stripping vapor from c). And e) using the increased pressure stripping vapor from d) as the stripping vapor in b).

According to yet another aspect of the present invention there is provided a system for handling fluid streams in a cellulose pulp mill comprising the following components: A stripping column having a bottom and top. A reboiler having a top and bottom. A conduit containing foul condensate containing HAPs collected from a cellulose pulp mill and connected to the stripping column at a first point between the top and bottom thereof. A conduit containing stripper overhead vapor extending from adjacent the stripping column top and connected to the reboiler at a second point between the top and bottom thereof. A first clean condensate conduit extending from adjacent the stripping column bottom, and a second clean condensate conduit extending from adjacent the reboiler bottom. A vapor pressure-increasing device. A vapor discharge conduit extending from a third point of the reboiler between the second point and the reboiler bottom, and connected to the vapor pressure-increasing device, And a conduit which transports pressure-increased vapor from the vapor pressure-increasing device to the stripping column at a fourth point between the first point and the stripper column bottom.

The system desirably further comprises an external condenser, and a conduit extending outwardly from the reboiler to the condenser. Also, preferably there is provided a first condensate-containing conduit connected from the external condenser to the stripper column at a fifth point between the fourth point and the stripper column top, and a second condensate-containing conduit connected from the reboiler to the fifth point.

While a wide variety of other conventional devices may be used, preferably in the system the vapor pressure-increasing device comprises a steam ejector. The system also preferably further comprises an indirect heat exchanger connected to the first and second clean condensate conduits and the conduit containing foul condensate including HAPs.

It is the primary object of the present invention to provide a method and system that comply with the Cluster Rules, and other environmental regulations, for handling HAPs in a cellulose pulp mill in an energy efficient and cost effective manner. This and other objects of the invention will become clear from an inspection of the detailed description of the invention, and from the appended claims.

DETAILED DESCRIPTION OF THE DRAWINGS

Figure 1:
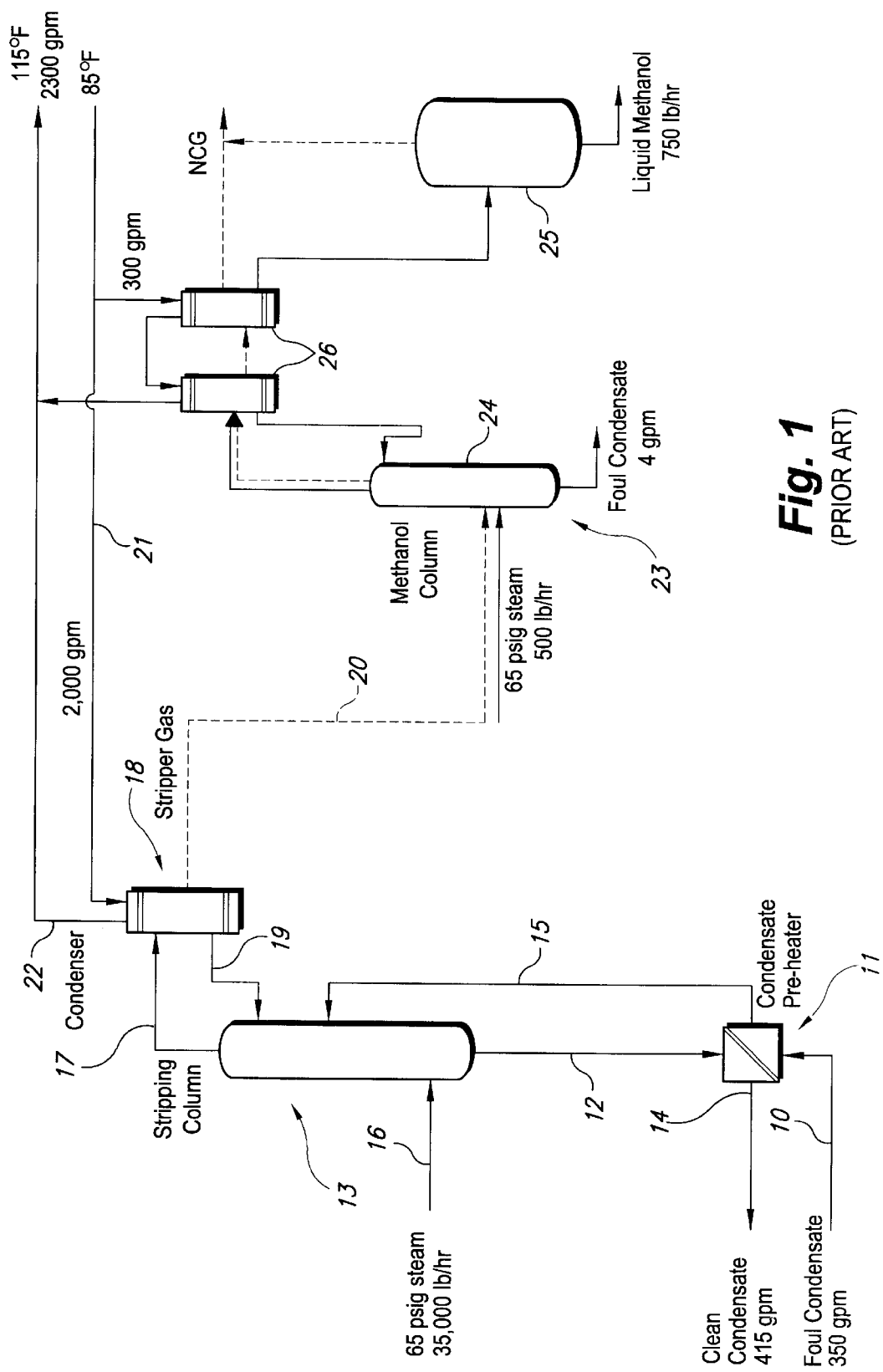
FIG. 1 is a schematic illustration of an exemplary prior art system for complying with the Cluster Rules in a cellulose pulp mill.

FIG. 1 illustrates a conventional prior art system for steam stripping, that is using steam as a cleaning media to condense the stripper overhead vapor into a cooling media (that is cooling water, black liquor, or the like). Foul condensates are collected from the mill and fed in line 10 to a treating system that utilizes large strippers. Typically the foul condensate first passes through a condensate preheater 11 where it is brought in indirect heat relationship with clean condensate in line 12 from the conventional stripping column 13. The cooled clean condensate is discharged in line 14 for other use within the mill, while the heated foul condensate passes in line 15 to a central section of the stripping column 13.

In conventional systems like that of FIG. 1 a large volume of steam is necessary in order to effect stripping. For example, to strip a foul condensate flow of about 350 gpm, about 65 psig steam in line 16 at about 35,000 pounds per hour is fed to a bottom section of the stripping column 13, and a stripper overhead vapor 17 is produced. That vapor 17 is fed to a conventional trim condenser 18, and the liquid from the condenser 18 is fed in line 19 back to the stripping column 13 at a top section thereof. The stripper gas is discharged from the trim condenser 18 in line 20. Low temperature liquid, such as water, in line 21 is fed to the condenser 18 while higher temperature water in line 22 is discharged from the condenser 18. For example, water in line 21 can be at about 85° F. and supplied at about 2000 gallons per minute, while the discharge in line 22 is at about 115° F.

FIG. 1 also illustrates a conventional methanol condensing plant, shown schematically at 23, and including a methanol column 24, liquid methanol tank 25, and condensers 26, etc. However, it is to be understood that the methanol condensing plant 23 is optional, and instead the stripper gas in line 20 may merely be destroyed by conventional thermal oxidation, or otherwise handled in a conventional manner.

A problem with the conventional system of FIG. 1 is that since the Cluster Rules require collection of a large volume of foul condensates large strippers must be utilized and the amount of steam required for efficient stripping of the volatiles that are produced in the kraft pulp cooking process (or other chemical cellulose pulping process) is difficult to easily obtain. Mills seldom have large amounts of steam on hand for this purpose. For example, stripping the volatiles from the foul condensates in line 10 from a conventional kraft pulp cooking process varies between about 18–28 pounds of steam per 100 pounds of condensate to be stripped. Therefore, a need exists for an economical way to preserve heat in the stripping system and to significantly reduce the steam requirements while still effectively stripping the foul condensate, and complying with the Cluster Rules.

Figure 2:
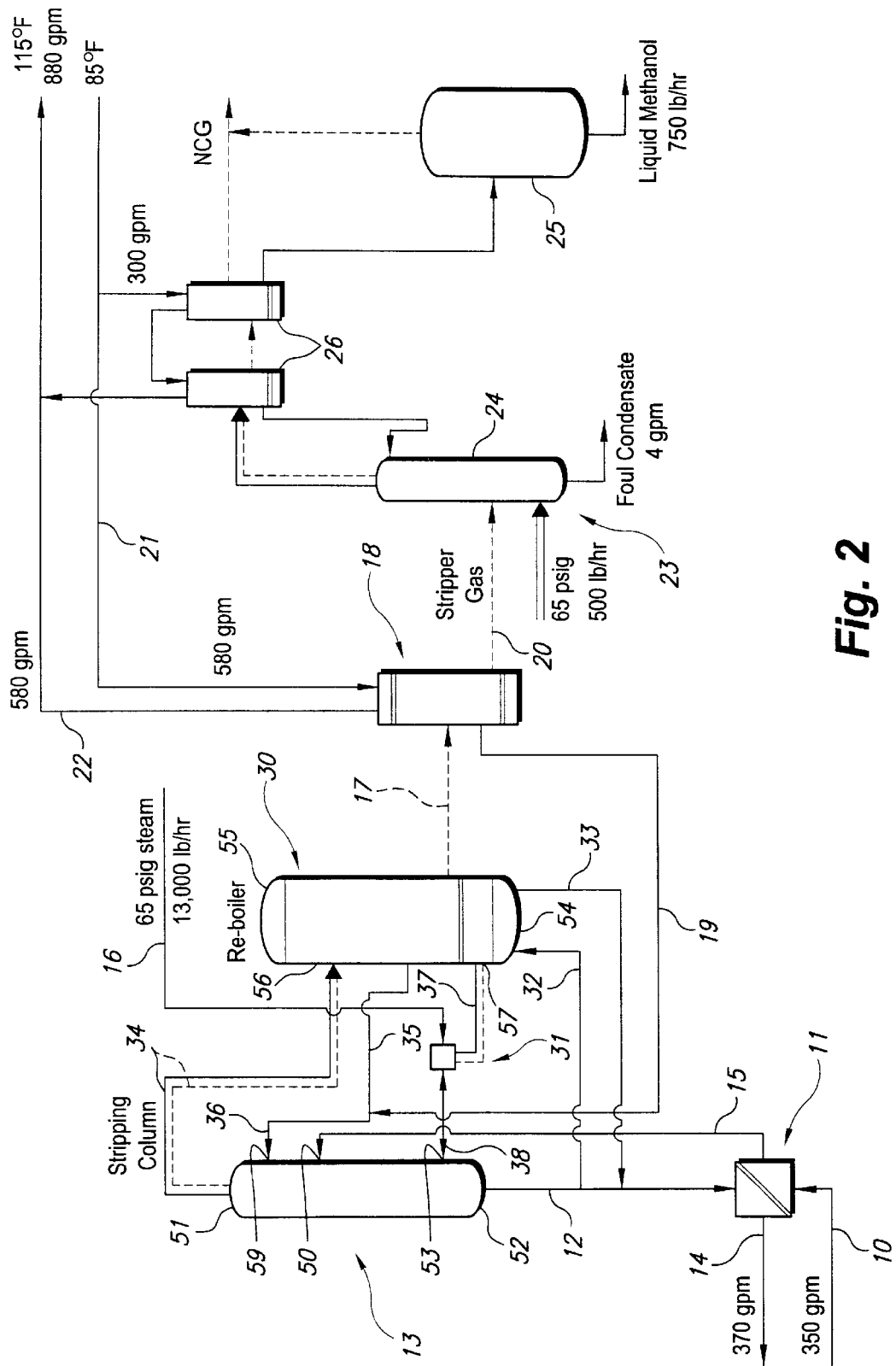
FIG. 2 is a schematic like that of FIG. 1 only showing a system according to the present invention for practicing the method of the present invention.

According to the present invention a system is provided, such as that schematically illustrated in FIG. 2, for practicing a method of steam stripping to effect Cluster Rules compliance. In FIG. 2 components that are identical to, or very similar to, those illustrated in FIG. 1 are shown by the same reference numeral; whereas added components are shown by a different reference numeral.

In the inventive system of FIG. 2, the major components that have been added are the conventional reboiler 30 and a conventional steam ejector 31. All or part of the clean condensate in line 12 is diverted via line 32 to the bottom of the reboiler 30, while clean condensate withdrawn from the reboiler 30 in line 33 is routed back to the clean condensate in line 12. The stripper overhead vapor is provided in line 34 to the reboiler 30 as opposed to directly to the condenser 18, and the line 17 providing stripper overhead vapor to the condenser 18 is from the bottom section of the reboiler 30.

Condensate condensed in the reboiler 30 is fed in line 35 to be combined with the condensate in line 19 from the condenser 18 to provide the line 36 (which takes the place of the line 19 in FIG. 1) for feeding condensate to a top section of the stripping column 13. The condensate in line 35 is the fraction of stripper overhead vapor condensed in the reboiler 30. This combined condensate (in line 36) is typically called the "re-flux condensate".

The vapor generated in the reboiler 30 is fed by a line 37 to the steam ejector 31. This reboiled condensate, in line 37, exits the reboiler 30 at a lower pressure than required for re-entry into the stripper 13. Therefore, its pressure has to be increased. While other conventional vapor pressure-increasing devices or mechanisms for increasing the pressure of the reboiled condensate so that it can be introduced into the stripping column 13 may be provided, the steam ejector 31 is preferred. The steam in line 16 then is fed to the steam ejector 31 rather than to the stripping column 13 (as in the FIG. 1 prior art construction) in the practice of the invention. The gas fraction in line 17 is vented from the reboiler 30 to the external condenser 18. The pressurized reboiled condensate in line 37, with the steam introduced at 16, is then introduced by a line 38 to the stripping column 13, preferably at substantially the same point that the steam in line 16 is introduced per se in the prior art configuration of FIG. 1.

In the FIG. 2 embodiment of the invention, as in the FIG. 1 prior art system, instead of the stripper gas in line 20 being fed to the methanol condensation plant 23, it may be thermally destroyed in a conventional manner, or otherwise handled in manners known in the art.

The invention of FIG. 2 thus—instead of condensing the strip per overhead vapor to an external source—is primarily condensed in a reboiler (30) that generates vapor out of the clean, stripped condensate. This results in a significant energy saving, and allows a significant reduction in the amount of steam necessary to effect proper stripping. In FIGS. 1 and 2 the volume of flow figures are provided for the various streams. Note that given the same foul condensate volume of about 350 gallons per minute in FIGS. 1 and 2, according to the construction of FIG. 2 only about 13,000 pounds per hour of about 65 psig steam needs to be used to effect stripping; whereas in the prior art system of FIG. 1 about 35,000 pounds per hour of about 65 psig steam is necessary. Also, according to the invention the volume of cool water supplied in line 21 to the condenser 18 is much less than in the prior art (about 580 gpm in FIG. 2 compared to about 2000 gpm in FIG. 1, e.g. less than about ⅓ of that in the prior art).

The method of handling fluid streams in a cellulose pulp mill according to the invention thus uses, in the preferred embodiment, a conventional stripping column 13 and a conventional reboiler 30. Foul condensate containing HAPs is collected in a cellulose pulp mill, fed in indirect heat exchange relationship, at heat exchanger 11, in line 10 with clean condensate to preheat it, and then it is fed in line at to a first point 50 of the stripping column 13 between the top 51 and bottom 52 thereof. In the stripping column 13 the foul condensate flows countercurrently to stripping vapor, typically clean steam, which is introduced at point 53 between the point 50 and the bottom 52, preferably so that the condensate falls downwardly and the stripping vapor moves upwardly within the column 13. This produces a HAPs-rich vapor in line 34, and a clean condensate in line 12. The line 12 extends outwardly from the column 13 adjacent the bottom 52 thereof, while the line 34 extends outwardly from the column 13 adjacent the top 51 thereof.

At least some of the clean condensate from the stripping column 13, that is in line 32, is fed from the column 13 to the reboiler 30, preferably adjacent the bottom 54 of the reboiler 30, and remote from the top 55 thereof. The HAPs-rich vapor in line 34 is directed to the reboiler 30, e.g. entering at a point 56 between the top and bottom 55, 54, and typically closer to the top 55. That vapor in line 34, commonly known as the stripper overhead vapor, at least partially condenses in the reboiler 30 while it vaporizes the clean condensate introduced in line 32, to form a stripping vapor from the clean condensate fed in line 32. The clean condensate vapor is discharged from the reboiler 30 at point 57, adjacent the bottom 54 and between the bottom 54 and the point 56 in the preferred embodiment, and then the pressure of the vapor in the line 37 is increased. This is preferably done in the steam ejector 31, with clean steam at between about 60–165 psig fed in line 16 to the steam ejector 31. Then the increased pressure stripping vapor from line 37 (combined with the fresh steam added in 16 where a steam ejector is utilized) is fed in line 38 to the point 53 on the column 13 to act as the stripping vapor in the column 13. The remaining (non-condensed) stripper overhead vapor in line 17 discharged from the reboiler 30 is fed to the external condenser 18. The condensate in line 19 from the condenser 18 is preferably combined with the dirty (from the stripper overhead vapor) condensate in line 35 to be introduced at a point 59 into the column 13, between the point 50 and the top 51. That condensate also flows countercurrently with the stripping vapor introduced at 53 within the column 13.

A typical size stripping column used in a kraft pulp mill the invention has advantages in both lower steam consumption and lower external cooling requirements. The steam consumption can be less than 50%, e.g. as little as about 20–25%, of the traditional requirement, (e.g. as in FIG. 1) depending upon the steam pressure available for the steam ejector 31. While a pressure of about 65 psig of steam has been assumed for the ejector 31 in FIG. 2, it is to be understood that a wide variety of pressures can be utilized, for example, all pressures commonly available in a pulp mill may be used. Typically the higher the steam pressure the more benefit can be obtained by practicing the invention both in reduced steam consumption and in lower external cooling requirements.

A wide variety of other modifications are also possible within the scope of the invention, which is not limited to the embodiment of the system and methods illustrated and described, but is limited only by the prior art, and encompasses all equivalent methods and systems.

What is claimed is:

1. A method of handling fluid streams in a cellulose pulp mill using a stripping column and reboiler, comprising:

a) collecting foul condensate containing Hazardous Air Pollutants (HAPs) in a cellulose pulp mill;

b) feeding the foul condensate to the stripping column;

c) in the stripping column, causing the foul condensate to flow countercurrently to a stripping vapor so as to produce a HAPs-rich vapor and a clean condensate;

d) feeding at least part of the clean condensate from c) from the stripping column to the reboiler;

e) directing the HAPs-rich vapor from c) to enter the reboiler and at least partially condense while vaporizing clean condensate fed into the reboiler in d) to form a stripping vapor;

f) increasing the pressure of the stripping vapor from e); and g) using the increased pressure stripping vapor from f) as the stripping vapor in c);

wherein f) is practiced to increase the pressure of the stripping vapor to between about 0.1 to 30 psig.

2. A method as recited in claim 1 wherein f) is practiced using a steam ejector.

3. A method as recited in claim 2 wherein the steam ejector is supplied with clean steam at a pressure of between about 60–165 psig.

4. A method as recited in claim 3 further comprising using the clean steam supplied to the steam ejector with the stripping vapor from e) as the stripping vapor in g).

5. A method of handling fluid streams in a cellulose pulp mill using a stripping column and reboiler, comprising:

a) collecting foul condensate containing Hazardous Air Pollutants (HAPs) in a cellulose pulp mill;

b) feeding the foul condensate to the stripping column;

c) in the stripping column, causing the foul condensate to flow countercurrently to a stripping vapor so as to produce a HAPs-rich vapor and a clean condensate;

d) feeding at least part of the clean condensate from c) from the stripping column to the reboiler;

e) directing the HAPs-rich vapor from c) to enter the reboiler and at least partially condense while vaporizing clean condensate fed into the reboiler in d) to form a stripping vapor;

f) increasing the pressure of the stripping vapor from e); and g) using the increased pressure stripping vapor from f) as the stripping vapor in c);

further comprising h) feeding the partially condensed HAPs-rich vapor from e) to the stripping column.

6. A method as recited in claim 5 wherein h) is practiced by feeding the partially condensed HAPs-rich vapor to the stripping column above the area where the foul condensate in b) is fed.

7. A method as recited in claim 5 wherein part of the HAPs-rich vapor is fed from the reboiler to an external condenser to condense into condensate; and wherein the condensate from the external condenser is combined with the partially condensed vapor from h) and fed to the stripping column.

8. A method of handling fluid streams in a cellulose pulp mill using a stripping column and reboiler, comprising:
   a) collecting foul condensate containing Hazardous Air Pollutants (HAPs) in a cellulose pulp mill;
   b) feeding the foul condensate to the stripping column;
   c) in the stripping column, causing the foul condensate to flow countercurrently to stripping vapor so as to produce a HAPs-rich vapor and a clean condensate;
   d) feeding at least part of the clean condensate from c) from the stripping column to the reboiler;
   e) directing the HAPs-rich vapor from c) to enter the reboiler and at least partially condense while vaporizing clean condensate fed into the reboiler in d) to form a stripping vapor;
   f) increasing the pressure of the stripping vapor from e);
   g) using the increased pressure stripping vapor from f) as the stripping vapor in c); and
   further comprising h) using the clean condensate from the reboiler elsewhere in the pulp mill.

9. A method of handling fluid streams in a cellulose pulp mill using a stripping column and reboiler, comprising:
   a) collecting foul condensate containing Hazardous Air Pollutants (HAPs) in a cellulose pulp mill;
   b) feeding the foul condensate to the stripping column;
   c) in the stripping column, causing the foul condensate to flow countercurrently to a stripping vapor so as to produce a HAPs-rich vapor and a clean condensate;
   d) feeding at least part of the clean condensate from c) from the stripping column to the reboiler;
   e) directing the HAPs-rich vapor from c) to enter the reboiler and at least partially condense while vaporizing clean condensate fed into the reboiler in d) to form a stripping vapor;
   f) increasing the pressure of the stripping vapor from e); and
   g) using the increased pressure stripping vapor from f) as the stripping vapor in c);
   wherein part of the HAPs-rich vapor is fed from the reboiler to an external condenser to condense into condensate; and wherein the condensate from the external condenser is fed to the stripping column.

10. A method as recited in claim 9 wherein a)–g) are practiced so as to use less than about 1/3 of an amount of cooling water needed to effect condensation in the external condenser when d)–g) are not practiced.

11. A method of handling fluid streams in a cellulose pulp mill using a stripping column and reboiler, comprising:
   a) collecting foul condensate containing Hazardous Air Pollutants (HAPs) in a cellulose pulp mill;
   b) feeding the foul condensate to the stripping column;
   c) in the stripping column, causing the foul condensate to flow countercurrently to a stripping vapor so as to produce a HAPs-rich vapor and a clean condensate;
   d) feeding at least part of the clean condensate from c) from the stripping column to the reboiler;
   e) directing the HAPs-rich vapor from c) to enter the reboiler and at least partially condense while vaporizing clean condensate fed into the reboiler in d) to form a stripping vapor;
   f) increasing the pressure of the stripping vapor from e); and
   g) using the increased pressure stripping vapor from f) as the stripping vapor in c);
   wherein a)–g) are practiced so as to use less than 50% of the steam necessary to strip the same amount of foul condensate produced when d)–g) are not practiced.

12. A method of handling fluid streams in a cellulose pulp mill using a stripping column and reboiler, comprising:
   a) collecting foul condensate containing Hazardous Air Pollutants (HAPs) in a cellulose pulp mill;
   b) feeding the foul condensate to the stripping column;
   c) in the stripping column, causing the foul condensate to flow countercurrently to a stripping vapor so as to produce a HAPs-rich vapor and a clean condensate;
   d) feeding at least part of the clean condensate from c) from the stripping column to the reboiler;
   e) directing the HAPs-rich vapor from c) to enter the reboiler and at least partially condense while vaporizing clean condensate fed into the reboiler in d) to form a stripping vapor;
   f) increasing the pressure of the stripping vapor from e); and
   g) using the increased pressure stripping vapor from f) as the stripping vapor in c);
   wherein a)–g) are practiced so as to use about 20–25% of the steam necessary to strip the same amount of foul condensate produced when d)–g) are not practiced.

13. A method of handling fluid streams in a cellulose pulp mill using a stripping column and reboiler, comprising:
   a) collecting foul condensate containing Hazardous Air Pollutants (HAPs) in a cellulose pulp mill;
   b) feeding the foul condensate to the stripping column;
   c) in the stripping column, causing the foul condensate to flow countercurrently to a stripping vapor so as to produce a HAPs-rich vapor and a clean condensate;
   d) feeding at least part of the clean condensate from c) from the stripping column to the reboiler;
   e) directing the HAPs-rich vapor from c) to enter the reboiler and at least partially condense while vaporizing clean condensate fed into the reboiler in d) to form a stripping vapor;
   f) increasing the pressure of the stripping vapor from e); and
   g) using the increased pressure stripping vapor from f) as the stripping vapor in c);
   wherein the stripping vapor in c) is at a pressure of about 0.1 to 30 psig.

14. A method of handling fluid streams in a cellulose pulp mill using a stripping column and reboiler, comprising:
   a) collecting foul condensate containing Hazardous Air Pollutants (HAPs) in a cellulose pulp mill;
   b) feeding the foul condensate to the stripping column;
   c) in the stripping column, causing the foul condensate to flow countercurrently to a stripping vapor so as to produce a HAPs-rich vapor and a clean condensate;
   d) feeding at least part of the clean condensate from c) from the stripping column to the reboiler;
   e) directing the HAPs-rich vapor from c) to enter the reboiler and at least partially condense while vaporizing clean condensate fed into the reboiler in d) to form a stripping vapor;
   f) increasing the pressure of the stripping vapor from e); and
   g) using the increased pressure stripping vapor from f) as the stripping vapor in c);
   wherein c) is practiced to cause the stripping vapor to move upwardly while the foul condensate moves downwardly in the stripping column.

* * * * *